United States Patent
Omura (10) Patent No.: US 8,854,338 B2
(45) Date of Patent: Oct. 7, 2014

(54) DISPLAY APPARATUS AND METHOD OF CONTROLLING DISPLAY APPARATUS

(71) Applicant: Katsuyuki Omura, Tokyo (JP)

(72) Inventor: Katsuyuki Omura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 22 days.

(21) Appl. No.: 13/851,283

(22) Filed: Mar. 27, 2013

(65) Prior Publication Data
US 2013/0257816 A1    Oct. 3, 2013

(30) Foreign Application Priority Data

Mar. 30, 2012 (JP) ................................ 2012-082239

(51) Int. Cl.
G06F 3/042    (2006.01)
G06F 3/041    (2006.01)

(52) U.S. Cl.
CPC ............ *G06F 3/0421* (2013.01); *G06F 3/0428* (2013.01); *G06F 2200/1614* (2013.01); *G06F 3/0418* (2013.01)
USPC ......... 345/175; 345/178; 345/207; 178/18.09

(58) Field of Classification Search
USPC ............... 345/175, 178, 158, 207; 178/18.09, 178/19.05; 250/200
See application file for complete search history.

(56) References Cited

U.S. PATENT DOCUMENTS

| | | | |
|---|---|---|---|
| 4,507,557 A | 3/1985 | Tsikos | |
| 4,700,176 A | 10/1987 | Adler | |
| 4,943,806 A * | 7/1990 | Masters et al. | 341/31 |
| 6,429,856 B1 * | 8/2002 | Omura et al. | 345/175 |
| 6,563,491 B1 * | 5/2003 | Omura | 345/173 |
| 7,113,174 B1 * | 9/2006 | Takekawa et al. | 345/173 |
| 2003/0001825 A1 * | 1/2003 | Omura et al. | 345/173 |
| 2003/0006973 A1 * | 1/2003 | Omura et al. | 345/175 |
| 2003/0206306 A1 * | 11/2003 | Omura et al. | 356/620 |
| 2005/0190162 A1 * | 9/2005 | Newton | 345/175 |
| 2005/0264541 A1 * | 12/2005 | Satoh | 345/173 |
| 2006/0232792 A1 * | 10/2006 | Kobayashi | 356/621 |

(Continued)

FOREIGN PATENT DOCUMENTS

| | | |
|---|---|---|
| JP | 61-239322 | 10/1986 |
| JP | 2008-176802 | 7/2008 |

(Continued)

OTHER PUBLICATIONS

U.S. Appl. No. 13/677,934, filed Nov. 15, 2012.

(Continued)

*Primary Examiner* — Lun-Yi Lao
*Assistant Examiner* — Kelly B Hegarty
(74) *Attorney, Agent, or Firm* — IPUSA, PLLC (57) ABSTRACT

A display apparatus includes a pointing device including a light emitting unit and a light receiving unit to detect a position of an object inserted into an optical path between the light emitting unit and a light receiving unit, wherein the pointing device includes an optical intensity store unit configured to store an optical intensity distribution detected by the light receiving unit in a memory unit upon detection of a change in a position or location of a display, and a position calculating unit configured to detect the position of the object by detecting a dark point in the optical intensity distribution caused by the insertion of the object based on a difference between the optical intensity distribution stored in the memory unit and an optical intensity distribution subsequently detected by the light receiving unit.

4 Claims, 11 Drawing Sheets

(56) References Cited

U.S. PATENT DOCUMENTS

| | | |
|---|---|---|
| 2008/0291164 A1 | 11/2008 | Tanaka |
| 2009/0207154 A1* | 8/2009 | Chino .................... 345/175 |
| 2009/0213095 A1* | 8/2009 | Harada et al. ........... 345/175 |
| 2011/0037733 A1* | 2/2011 | Yi ........................... 345/175 |
| 2011/0096033 A1* | 4/2011 | Ko ........................... 345/175 |
| 2011/0187679 A1* | 8/2011 | Ko ........................... 345/175 |
| 2011/0210946 A1 | 9/2011 | Goertz et al. |
| 2012/0032976 A1 | 2/2012 | Nagahara et al. |
| 2012/0050197 A1 | 3/2012 | Kemmochi |
| 2012/0062591 A1 | 3/2012 | Omura et al. |
| 2012/0105829 A1* | 5/2012 | Shin et al. ................ 356/51 |
| 2012/0206387 A1 | 8/2012 | Omura et al. |
| 2012/0206410 A1* | 8/2012 | Chang ..................... 345/175 |
| 2012/0235934 A1 | 9/2012 | Kawasaki et al. |
| 2013/0016103 A1* | 1/2013 | Gossweiler et al. ...... 345/428 |
| 2013/0147766 A1* | 6/2013 | Chen et al. ............... 345/175 |

FOREIGN PATENT DOCUMENTS

| | | |
|---|---|---|
| JP | 2010-085479 | 4/2010 |
| JP | 4627781 | 2/2011 |
| WO | 2009/135321 | 11/2009 |

OTHER PUBLICATIONS

U.S. Appl. No. 13/688,617, filed Nov. 29, 2012.
Extended European search report dated Jul. 31, 2014.

* cited by examiner

DISPLAY APPARATUS AND METHOD OF CONTROLLING DISPLAY APPARATUS

BACKGROUND OF THE INVENTION

1. Field of the Invention

The disclosures herein relate to a display apparatus provided with an optical pointing device.

2. Description of the Related Art

Pointing devices that have been used include the one that detects an electrical change caused by electrostatic or electromagnetic induction when a pen comes in contact with a sensor surface or comes close to the sensor surface. Patent Document 1 (see the list of documents attached at the end of the description of embodiments) discloses another type of device that is an ultrasonic touch panel pointing device. This device detects the position of an object based on attenuation of surface acoustic waves caused by the object coming in contact with a panel on which the surface acoustic waves are propagating.

Further, Patent Document 2 and Patent Document 3 filed by the inventor of the present application disclose an optical touch panel display in which a shadow of a pen or finger is optically detected to calculate the coordinates of the contact point based on triangulation.

Further, Patent Document 4 also filed by the inventor of the present application discloses a mechanism that can change an elevation angle and depression angle of a display. Patent Document 5 discloses a rotation mechanism allowing rotation in a display plane.

The optical touch panel display disclosed in Patent Documents 2 and 3 perform calibration at the time of startup or at constant intervals. To be specific, an optical intensity distribution on an image sensor provided in the optical touch panel is stored in memory under the condition in which no pen or finger (hereinafter collectively referred to as a stylus) is not placed on the display surface. When a stylus is placed on the display surface (i.e., inserted into a detection plane), a resulting optical intensity distribution on the image sensor is compared with the optical intensity distribution stored in the memory to calculate a difference, thereby detecting the position at which the stylus is placed (or inserted). This is aimed at removing the effect of background components in an optical intensity distribution on the image sensor when such an effect is created by illumination light or the like that may vary depending on the place or time at which the optical touch panel display is used.

As disclosed in Patent Documents 4 and 5, the position of a display may be changed. When such a positional change occurs, and especially when the display surface is rotated as disclosed in Patent Document 5, there is a significant change in the relative positional relationship between the touch sensor provided in the touch panel attached to the display and the ceiling light or outside light coming through windows. Because of this, there is a need to perform calibration. Such calibration may need to be performed immediately upon a change in display position.

In typical display products provided with an optical touch panel, however, calibration is performed at the startup of the display or at constant intervals. Alternatively, users may need to be conscious and explicitly initiate calibration (e.g., through selection on the menu screen).

Accordingly, there may be a need to provide a display apparatus with an optical touch panel that can accurately detect coordinates by removing the effect of ambient light through an automatic calibration function that is executed when a positional change of the display apparatus occurs, such as a change in its location through movement in a vertical or horizontal direction or a change in its position regarding an elevation angle, a depression angle, an azimuth angle, and/or in-plane rotation.

SUMMARY OF THE INVENTION

It is a general object of at least one embodiment of the present invention to provide a display apparatus and a method of controlling a display apparatus that substantially obviate one or more problems caused by the limitations and disadvantages of the related art.

In one embodiment, a display apparatus includes a pointing device including a light emitting unit and a light receiving unit to detect a position of an object inserted into an optical path between the light emitting unit and a light receiving unit, wherein the pointing device includes an optical intensity store unit configured to store an optical intensity distribution detected by the light receiving unit in a memory unit upon detection of a change in a position or location of a display, and a position calculating unit configured to detect the position of the object by detecting a dark point in the optical intensity distribution caused by the insertion of the object based on a difference between the optical intensity distribution stored in the memory unit and an optical intensity distribution subsequently detected by the light receiving unit.

In one embodiment, a method of controlling a display apparatus having a pointing device including a light emitting unit and a light receiving unit to detect a position of an object inserted into an optical path between the light emitting unit and a light receiving unit includes an optical intensity store step of storing an optical intensity distribution detected by the light receiving unit in a memory unit upon detection of a change in a position or location of a display, and a position calculating step of detecting the position of the object by detecting a dark point in the optical intensity distribution caused by the insertion of the object based on a difference between the optical intensity distribution stored in the memory unit and an optical intensity distribution subsequently detected by the light receiving unit.

According to at least one embodiment, the display apparatus can accurately detect coordinates by removing the effect of ambient light through an automatic calibration function that is executed when a positional change of the display apparatus occurs, such as a change in its location through movement in a vertical or horizontal direction or a change in its position regarding an elevation angle, a depression angle, an azimuth angle, and/or in-plane rotation.

BRIEF DESCRIPTION OF THE DRAWINGS

Other objects and further features of embodiments will be apparent from the following detailed description when read in conjunction with the accompanying drawings.

DESCRIPTION OF THE PREFERRED EMBODIMENTS

In the following, embodiments of the present invention will be described with reference to the accompanying drawings.

<Configuration of Optical Pointing Device>

In the following, a description will be given of the configuration of an optical pointing device used in the present disclosures. The configuration described herein is only an example of an optical pointing apparatus, and the present invention is not limited to this configuration. Needless to say, the present invention is applicable to optical pointing devices in general.

Figure 1:
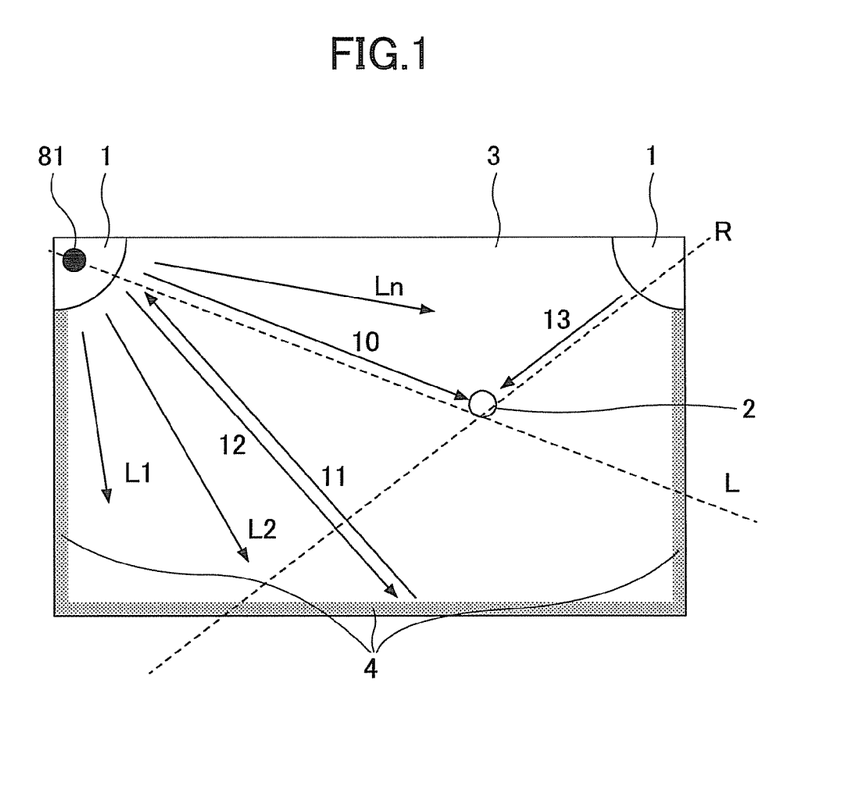
FIG. 1 is a drawing illustrating an example of the configuration of an optical pointing device.

FIG. 1 is a drawing illustrating an example of an optical pointing device used in the present disclosures. A coordinate detecting area 3 of the pointing device has a rectangular shape. The coordinate detecting area 3 may be a surface of a display that electronically displays images, or may be a white board on which a marker pen or the like is used to write. A pointing tool 2 such as a finger, pen, or pointer formed of optically opaque material may come in contact with the coordinate detecting area 3. The optical pointing device serves to detect the coordinates of the pointing tool 2.

Light emitting and receiving units 1 are disposed at the top left and top right corners of the coordinate detecting area 3, respectively. A light emitting and receiving unit 1 transmits light beams L1, L2, . . . Ln (probe light) towards the coordinate detecting area 3. The Illustration of beams is only for explanation purposes, and, in reality, a point light source 81 makes a fan-shaped light spread, such that light travels in a plane parallel to the coordinate detecting surface.

The perimeters of the coordinate detecting area 3 has a retro-reflector member 4 is attached thereto such that its retro-reflective surface is directed to the center of the coordinate detecting area 3. The retro-reflector member 4 has such characteristics that its surface reflects light back at the same angle as the incident angle regardless of the incident angle. The light emitting and receiving unit 1 transmits a light beam 12 that is included in the fan-shaped light spread. The light beam 12 is reflected by the retro-reflector member 4 to become a retro-reflection light beam 11, which travels in the same path as the path of the light beam 12 to return to the light emitting and receiving unit 1. The light emitting and receiving unit 1 is provided with a light receiving unit as will be described later. A check can be made as to whether retro-reflection light beams corresponding to the probe light beams L1 through Ln have returned to the light emitting and receiving unit 1.

A user may touch the position of the pointing tool 2 with his/her finger. In this case, the probe light beam 10 is blocked by the finger acting as the pointing tool 2 so that the probe light beam 10 does not reach the retro-reflector member 4. Retro-reflection light of the probe light beam 10 does not reach the light emitting and receiving unit 1. The detection of the fact that no retro-reflection light corresponding to the probe light beam 10 is received indicates the insertion of the pointing tool 2 into the path L of the probe light beam 10. Similarly, the light emitting and receiving unit 1 disposed at the top right corner also transmits a probe light beam 13. The detection of the fact that no retro-reflection light corresponding to the probe light beam 13 is received indicates the insertion of the pointing tool 2 into the path R of the probe light beam 13. Once the path L and the path R are known, the intersection of these paths can be calculated to obtain the coordinates of the point at which the pointing tool 2 is situated.

In the following, a description will be given of the configuration of the light emitting and receiving unit 1 and a mechanism for detecting which one of the probe light beams L1 through Ln is blocked.

Figure 2:
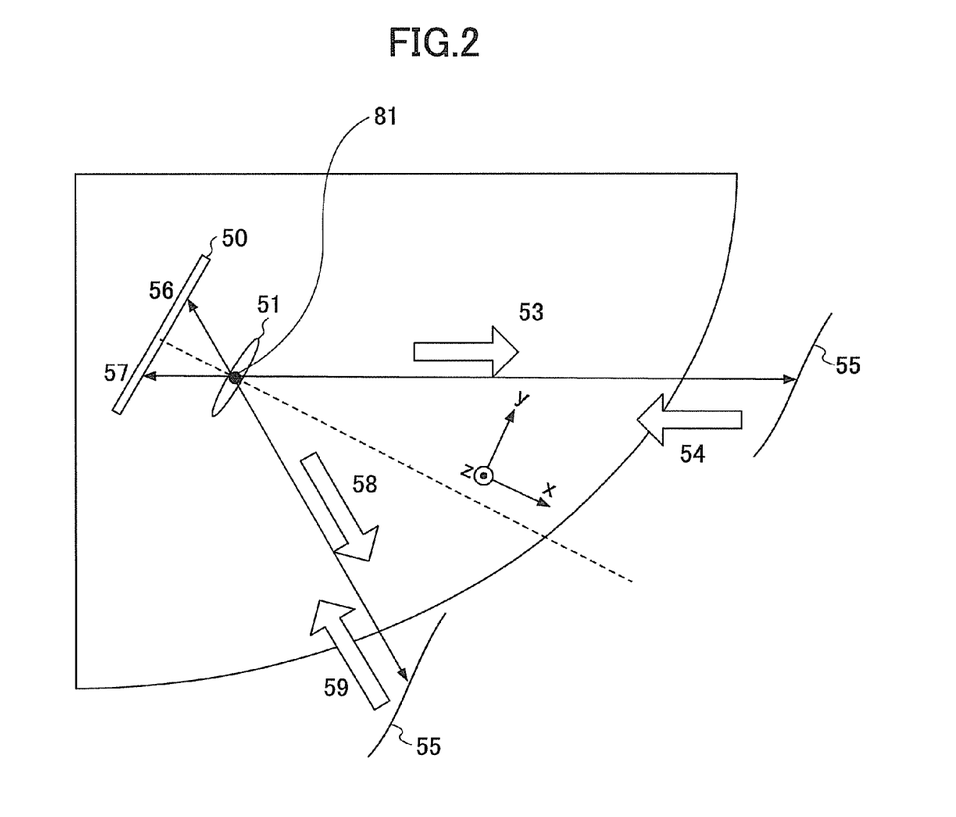
FIG. 2 is a drawing illustrating an example of the configuration of a light emitting and receiving unit.

FIG. 2 is a drawing illustrating the schematic configuration of the light emitting and receiving unit 1. FIG. 2 is a view, taken from the direction perpendicular to the coordinate detecting area 3 illustrated in FIG. 1, of the light emitting and receiving unit 1 attached to the coordinate detecting area 3. For the convenience of explanation, a description will be given by referring to a two-dimensional plane parallel to the coordinate detecting area 3.

This schematic configuration includes the point light source 81, a condenser lens 51, and a light receiving device 50. The point light source 81 makes a fan-shaped light spread in opposite directions to the light receiving device 50. The fan-shaped light spread made by the point light source 81 may be regarded as a collection of beams traveling in directions 53, 58, and other directions. The light beam traveling in the direction 53 is reflected by a retro-reflector member 55 to pass through the condenser lens 51 to reach a point 57 on the light receiving device 50. Further, the light beam traveling in the direction 58 is reflected by the retro-reflector member 55 to reach a point 56 on the light receiving device 50. In this manner, the light beams transmitted by the point light source 81 and reflected by the retro-reflector member 55 reach respective, different points on the light receiving device 50 through the function of the condenser lens 51. When a pointing tool is inserted at a given position to block a beam, no light reaches the point on the light receiving device 50 corresponding to this beam. A check of the optical intensity distribution on the light receiving device 50 can thus provide information about which one of the beams is blocked.

Figure 3:
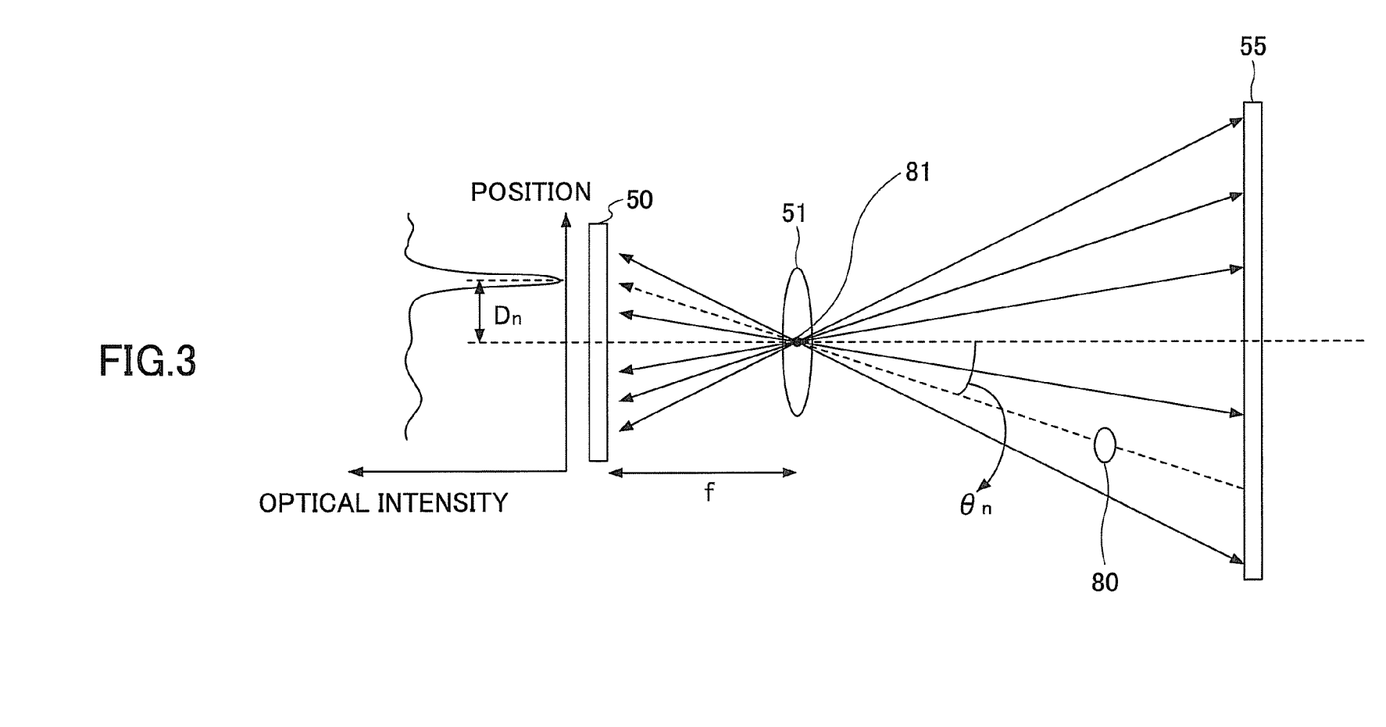
FIG. 3 is a drawing illustrating an example of relationships between the blocking of a light beam with a pointing tool and an optical intensity distribution on a light receiving device.
Figure 4:
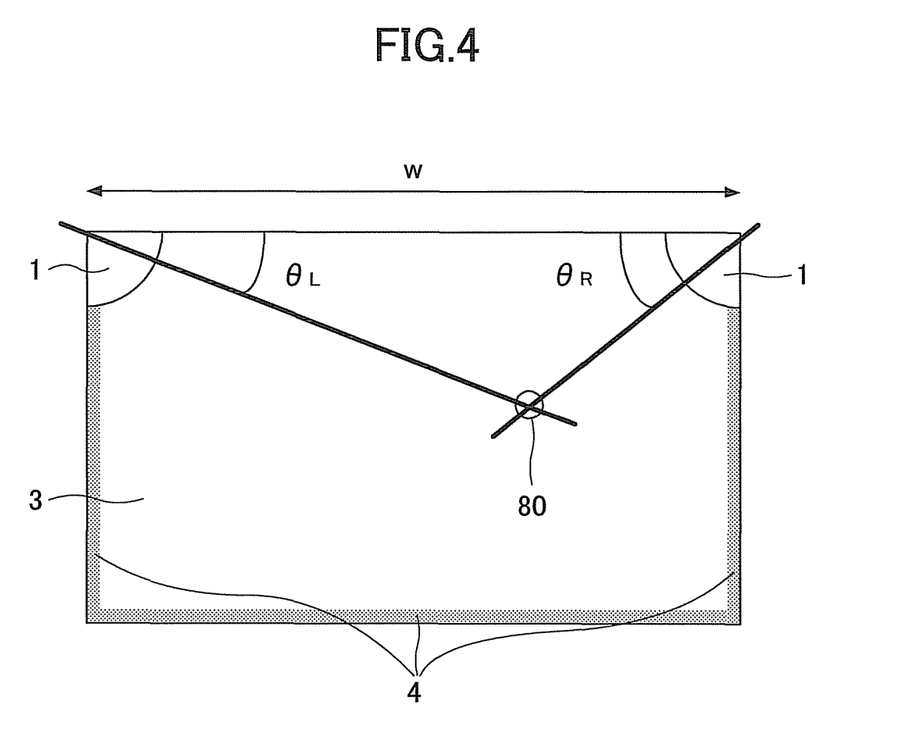
FIG. 4 is a drawing illustrating an example of the angular relationship between the light emitting and receiving unit and the pointing tool.

The operation described above will be further described in detail by referring to FIG. 3 and FIG. 4.

In FIG. 3, the light receiving device 50 is disposed at a focal plane of the condenser lens 51. Light emitted from the point light source 81 to the right in FIG. 3 is reflected by the retro-reflector member 55 to return through the same paths. The light thus condenses at the position of the point light source 81. The condenser lens 51 is situated such that its center point coincides with the position of the point light source 81. The retro-reflection light returning from the retro-reflector member 55 passes through the center of the condenser lens 51 so as to travel in symmetric paths on the rear side of the lens (i.e., on the same side of the lens as the light receiving device 50).

A description will be given of the optical intensity distribution on the light receiving device 50. In the absence of a pointing tool 80 at the illustrated position, the optical intensity distribution on the light receiving device 50 would be uniform. In the presence of the pointing tool 80 blocking light as illustrated in FIG. 3, the beam hitting the pointing tool 80 is blocked, which makes a weak light intensity point (i.e., dark point) at a position Dn on the light receiving device 50.

This position Dn corresponds to the transmission/incident angle θn of the blocked beam, so that the angle θn can be identified by detecting the position Dn. The angle θn is expressed as a function of the position Dn as follows.

$$\theta n = \arctan(Dn/f) \quad (1)$$

With respect to the light emitting and receiving unit situated at the top left corner in FIG. 1, θn is denoted as θnL, and Dn is denoted as DnL.

Further, transformation g is introduced to represent relative positional relationships between the light emitting and receiving unit 1 and the coordinate detecting area 3. With the transformation g, an angle θL defined by the pointing tool 80 and the coordinate detecting area 3 as illustrated in FIG. 4 is expressed as a function of DnL as follows.

$$\theta L = g(\theta nL) \quad (2)$$

where $\theta nL = \arctan(DnL/f)$

By the same token, the following corresponding expression is obtained with respect to the light emitting and receiving unit 1 situated at the top right corner in FIG. 1 by replacing "L" in the subscript of the above-noted expression with "R" and introducing transformation h to represent relative positional relationships between the light emitting and receiving unit 1 and the coordinate detecting area 3.

$$\theta R = h(\theta nR) \quad (3)$$

where $\theta nR = \arctan(DnR/f)$

The distance between the light emitting and receiving units 1 attached to the coordinate detecting area 3 is denoted as w as illustrated in FIG. 4. In this case, the coordinates (x, y) of the point indicted by the pointing tool 80 on the coordinate detecting area 3 are represented as follows.

$$x = w \cdot \tan(\theta R)/(\tan(\theta L) + \tan(\theta R)) \quad (4)$$

$$y = w \cdot \tan(\theta L) \cdot \tan(\theta R)/(\tan(\theta L) + \tan(\theta R)) \quad (5)$$

In this manner, the coordinates (x, y) are expressed as a function of DnL and DnR. Namely, the positions DnL and DnR of dark points on the light receiving devices 50 of the left and right light emitting and receiving units 1 are detected, and a geometrical arrangement of the light emitting and receiving units 1 is taken into account, thereby identifying the coordinates of the point indicated by the pointing tool 80.

<Example of Installment of Optical System on Display Surface>

In the following, a description will be given of an example of installment of the optical system described above on the surface of a display or the like.

Figure 5:
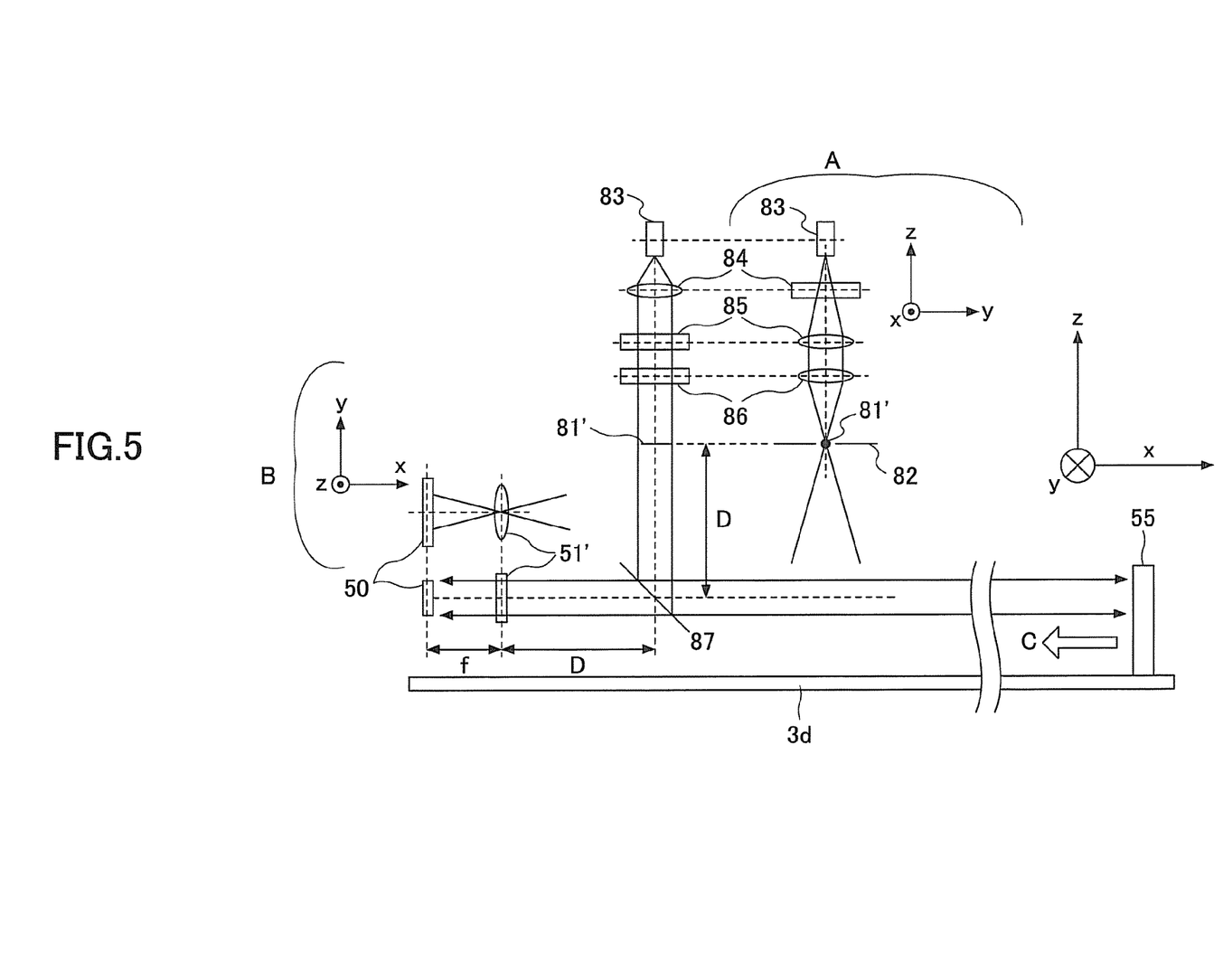
FIG. 5 is a drawing illustrating an example of an optical system mounted on a display surface.

FIG. 5 is a drawing illustrating an example of the configuration in which one of the light emitting and receiving units 1 illustrated in FIG. 1 and FIG. 2 is mounted on the surface of a display 3d. FIG. 5 illustrates a cross-section of the display 3d, which is taken along the x axis illustrated in FIG. 2 and viewed from the negative side on the y axis. Illustrative views A and B shown in FIG. 5 are provided for convenience of explanation with respect to the viewpoints as defined by the coordinate system shown alongside.

A description will be first given of a light emitting part of the light emitting and receiving unit.

A laser diode, a pinpoint LED, or the like that can focus a spot to some extent is used as a light source 83.

Light transmitted by the light source 83 toward the surface of the display 3d is collimated only in the x direction by a cylindrical lens 84. This collimation is made for the purpose of providing light traveling parallel to the surface of the display 3d after the light is reflected by a half mirror 87.

After passing through the cylindrical lens 84, the light is condensed in the y direction by two cylindrical lenses 85 and 86 whose longitudinal direction is perpendicular to the longitudinal direction of the cylindrical lens 84. The view A in FIG. 5 shows the arrangement of the cylindrical lenses and the way the light beam is condensed for the purpose of explaining the arrangement described above. The optical system shown in the view A is viewed from the x direction by rotating the optical system around the z axis.

Due to the functions of the cylindrical lenses, the light is condensed to form a line under the cylindrical lens 86. A thin, long slit 82 extending in the x direction and having a width in the y direction is placed at the position where the light condenses. Namely, a secondary light source 81' that is line shaped is formed at the position of the slit.

Light emitted from the secondary light source 81' is reflected by the half mirror 87 to travel along the surface of the display 3d. This traveling light does not spread but remains to be parallel light in the direction perpendicular to the surface of the display 3d, but spreads in a fan shape from the secondary light source 81' in the directions parallel to the surface of the display 3d. The light is then reflected by the retro-reflector member 55 mounted at the perimeters of the display, and travels in a direction C along the same paths to return to the half mirror 87. The light passing through the half mirror 87 travels parallel to the surface of the display 3d to pass through a cylindrical lens 51' to reach the light receiving device 50.

The secondary light source 81' and the condenser lens 51 are in a conjugate positional relationship with respect to the half mirror 87 (as indicated by D in FIG. 5). Namely, the secondary light source 81' corresponds to the point light source 81 illustrated in FIG. 3, and the cylindrical lens 51' corresponds to the condenser lens 51 illustrated in FIG. 3. The view B in FIG. 5 illustrates the receiving-end cylindrical lens and the light receiving device as viewed from the z direction. This view corresponds to the condenser lens 51 and the light receiving device 50 illustrated in FIG. 3.

<Example of Configuration of Display Apparatus with Optical Touch Panel>

In the following, a description will be given of an example of the configuration of a display apparatus with an optical touch panel.

Figure 6A:
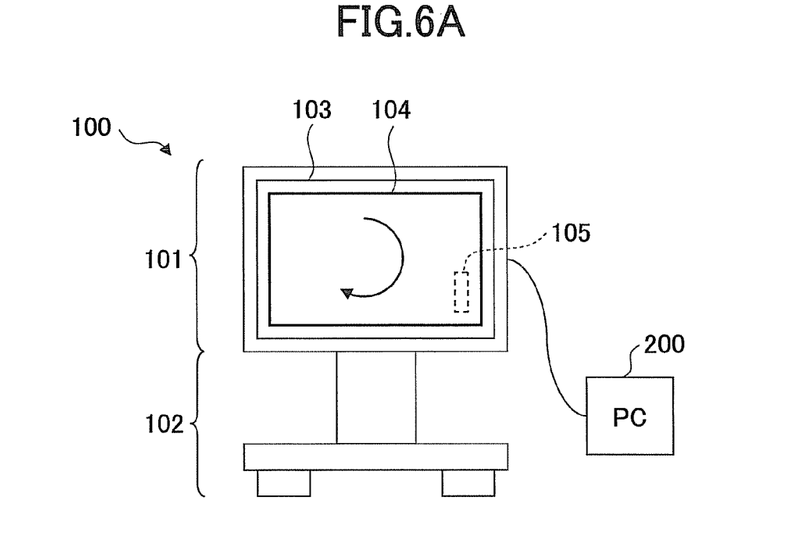
FIGS. 6A and 6B are drawings illustrating an example of the appearance of a display apparatus.
Figure 6B:
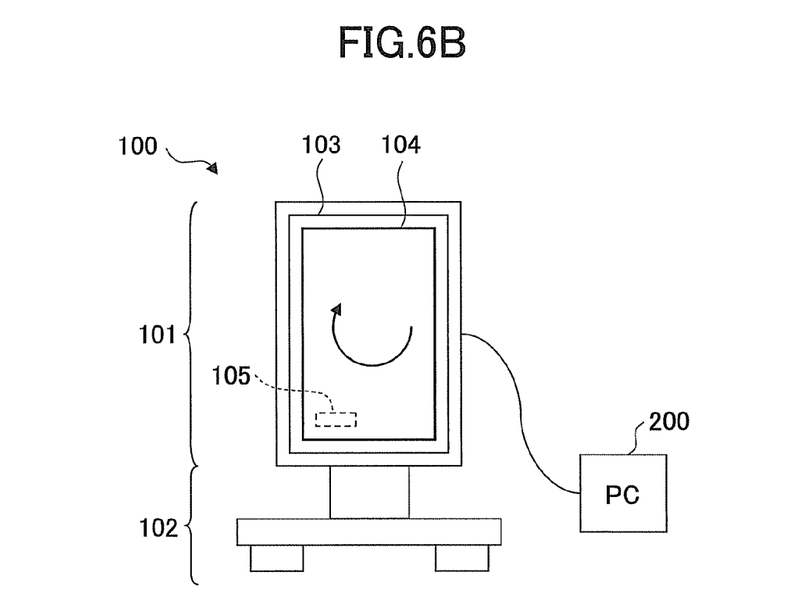

FIGS. 6A and 6B are drawings illustrating an example of the appearance of a display apparatus 100.

In FIGS. 6A and 6B, the display apparatus 100 includes a display unit 101 and a platform unit 102. The display apparatus 100 may be placed on a floor for use.

The display unit 101 includes a display 103 and a touch panel 104. The display 103 may be a liquid crystal panel or plasma display panel having an aspect ratio of 16 to 9. The touch panel 104 is the optical touch panel described heretofore, and is integrally attached to the display 103. The sensor heads illustrated in FIG. 1 and FIG. 2 may be mounted at the top right and top left corners, respectively, of the touch panel 104 in FIG. 6A, for example.

The display unit 101 is attached to the platform unit 102 through a rotation mechanism (not shown) that allows the display unit 101 to rotate in the surface plane of the drawing sheet. The display unit 101 with the touch panel 104 can rotate 90 degrees together. The display unit 101 may be placed with its longitudinal direction extending horizontally as illustrated in FIG. 6A, or may be placed with its longitudinal direction extending vertically as illustrated in FIG. 6B.

The touch panel 104 is provided with a rotation detecting unit 105 attached thereto. The rotation detecting unit 105 serves to detect the state of the display being horizontal (FIG. 6A) and the state of the display being vertical (FIG. 6B). The rotation detecting unit 105 may be implemented by use of a well-known technology and components, such as a mechanical switch in which an iron ball is encapsulated, or an acceleration sensor made of a semiconductor device.

The display apparatus 100 is connected to a personal computer 200, which generates video images to be displayed on the display 103.

Figure 7:
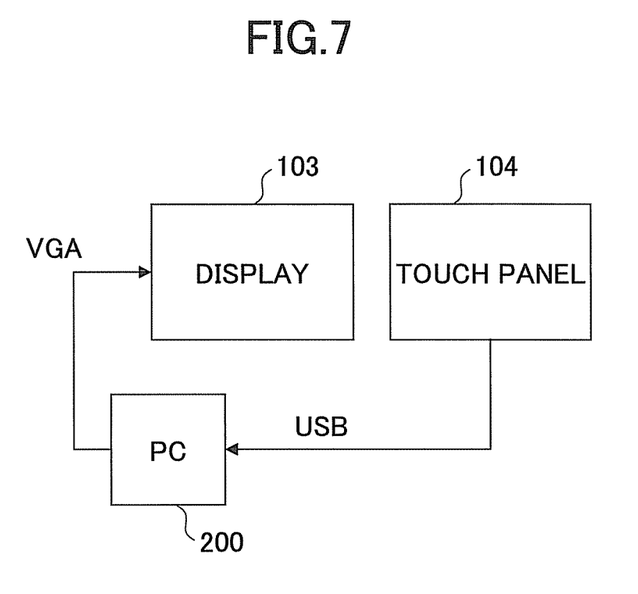
FIG. 7 is a drawing illustrating an example of a connection between a personal computer and a set of a display and a touch panel.

FIG. 7 is a drawing illustrating an example of a connection between the personal computer 200 and a set of the display 103 and the touch panel 104.

In FIG. 7, the video signals from the personal computer 200 are supplied to the display 103 via a VGA cable or the like. The touch panel 104 is connected to the personal computer 200 through a USB cable or the like. The touch panel 104 may be used to operate the personal computer 200, instead of using a mouse connected to the personal computer 200.

Figure 8:
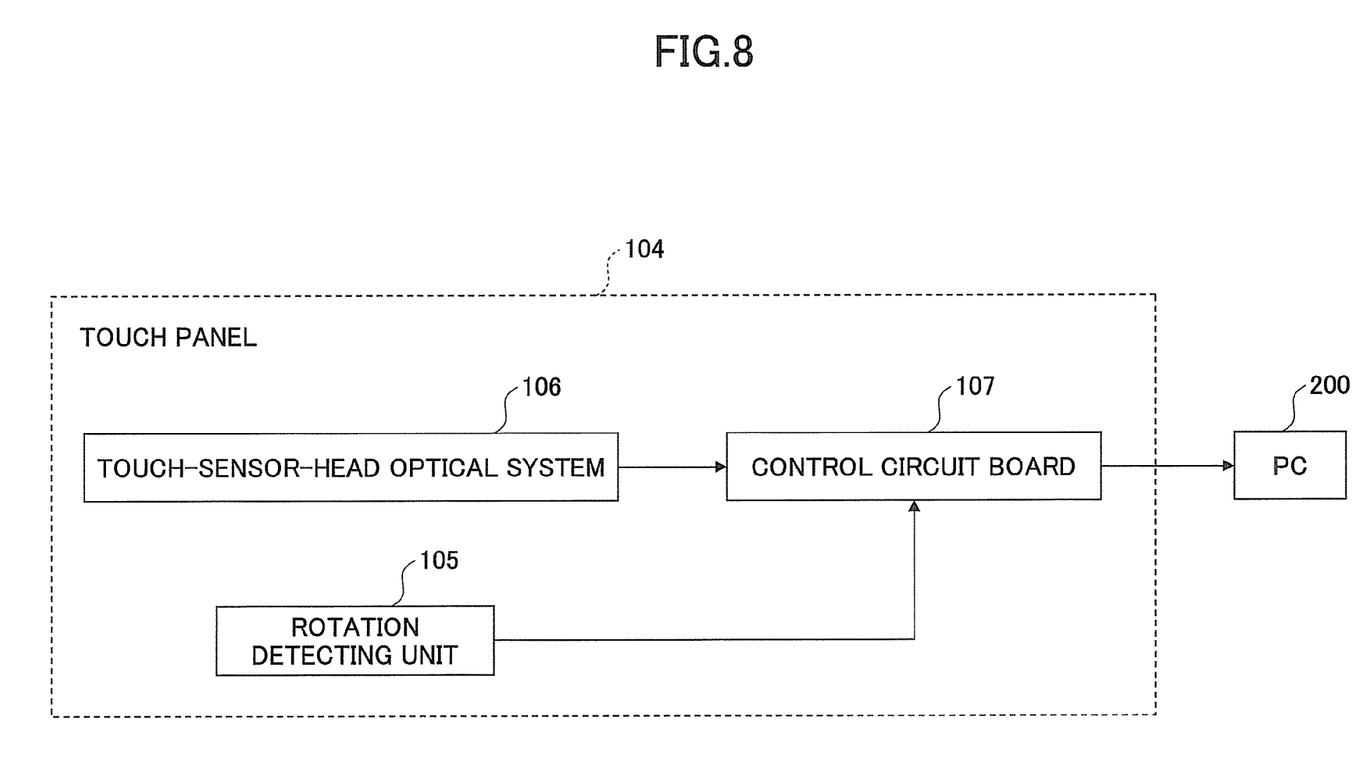
FIG. 8 is a drawing illustrating an example of the configuration of the touch panel.

FIG. 8 is a drawing illustrating an example of the configuration of the touch panel 104.

In FIG. 8, the touch panel 104 includes the rotation detecting unit 105, a touch-sensor-head optical system 106 and a control circuit board 107. As was previously described, the rotation detecting unit 105 is a sensor that detects the rotation of the touch panel 104, i.e., a sensor that detects the vertical positional state or the horizontal positional state. The touch-sensor-head optical system 106 has the optical system configuration as was previously described. The control circuit board 107 receives an image sensor signal output from the touch-sensor-head optical system 106 and a position signal output from the rotation detecting unit 105 indicative of the vertical positional state or the horizontal positional state. Based on these signals, the control circuit board 107 calculates coordinates. The control circuit board 107 is a signal processing board implemented by use of logic hardware or by use of a computing device such as a CPU and firmware.

Figure 9:
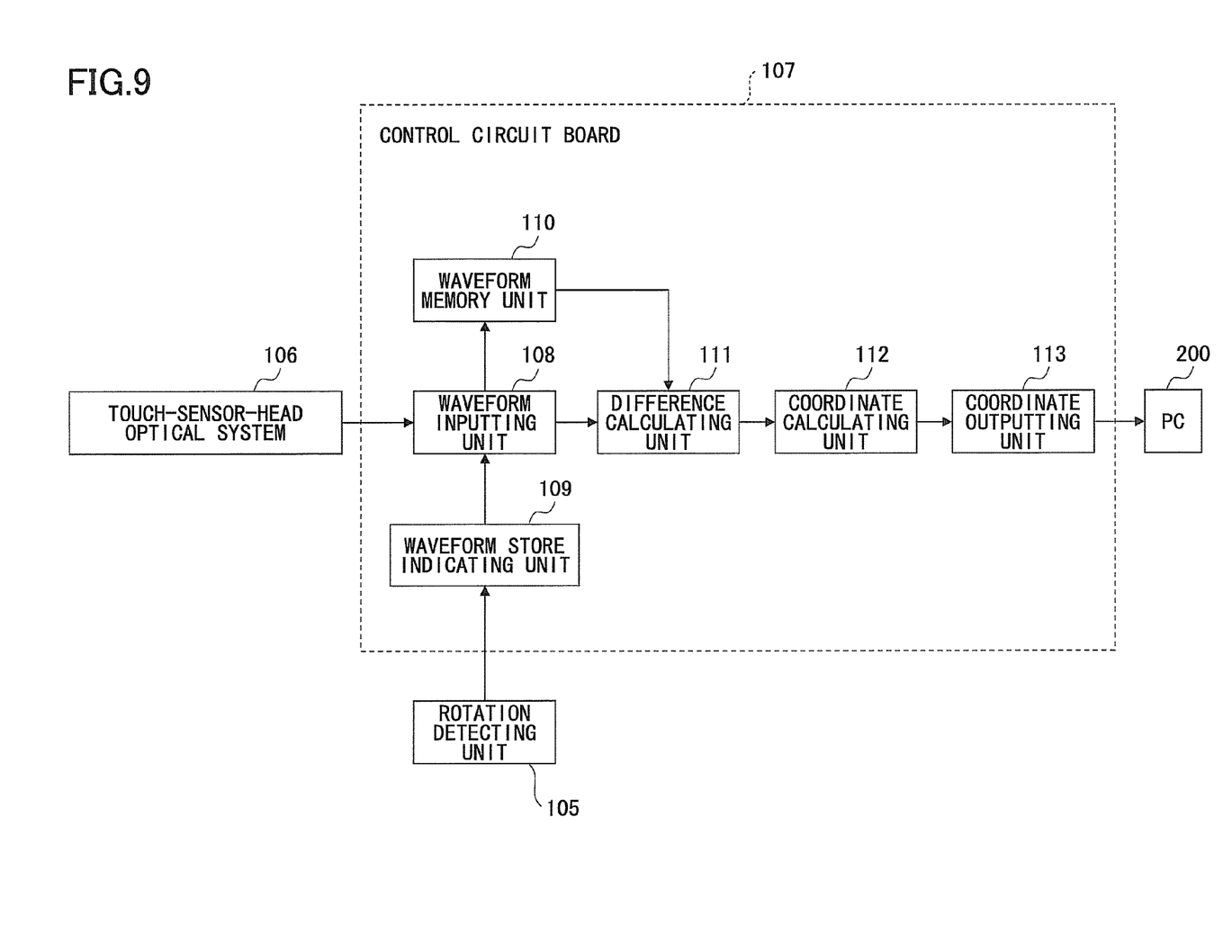
FIG. 9 is a drawing illustrating an example of the configuration of a control circuit board.

FIG. 9 is a drawing illustrating an example of the configuration of the control circuit board 107.

In FIG. 9, the control circuit board 107 includes a waveform inputting unit 108, a waveform store indicating unit 109, a waveform memory unit 110, a difference calculating unit 111, a coordinate calculating unit 112, and a coordinate outputting unit 113.

The waveform inputting unit 108 receives the image sensor signal from the touch-sensor-head optical system 106 at predetermined intervals. The image sensor signal indicates an optical intensity distribution on the light receiving device (image sensor) 50 illustrated in FIG. 3. The waveform inputting unit 108 uses an AD converter to convert the optical intensity distribution from the image sensor to digital pixel values. For example, an optical intensity from the image sensor is converted into an integer value ranging from 0 to 255 (8 bits). When the number of pixels of the image sensor is 1280, for example, digital values of 1280-x-8 bits are obtained through the conversion.

The waveform store indicating unit 109 receives a signal from the rotation detecting unit 105. When the signal from the rotation detecting unit 105 indicates a change from the horizontal positional state to the vertical positional state or from the horizontal positional state to the vertical positional state, the waveform store indicating unit 109 requests the waveform inputting unit 108 to store the image sensor signal received from the touch-sensor-head optical system 106 in the waveform memory unit 110 to overwrite existing data. The touch-sensor-head optical system 106 performs the same or similar operation when the control circuit board 107 is powered on or when the user explicitly initiates an initializing operation, thereby storing the image sensor signal in the waveform memory unit 110 to overwrite existing data. The waveform inputting unit 108 supplies the image sensor signal to the difference calculating unit 111 at predetermined intervals.

The difference calculating unit 111 calculates a difference between the signal waveform supplied from the waveform inputting unit 108 at the predetermined intervals and the waveform stored in the waveform memory unit 110. Based on the calculated difference, the position of a dark point on the image sensor created by an object in contact may be obtained by use of a proper threshold value.

Figure 10:
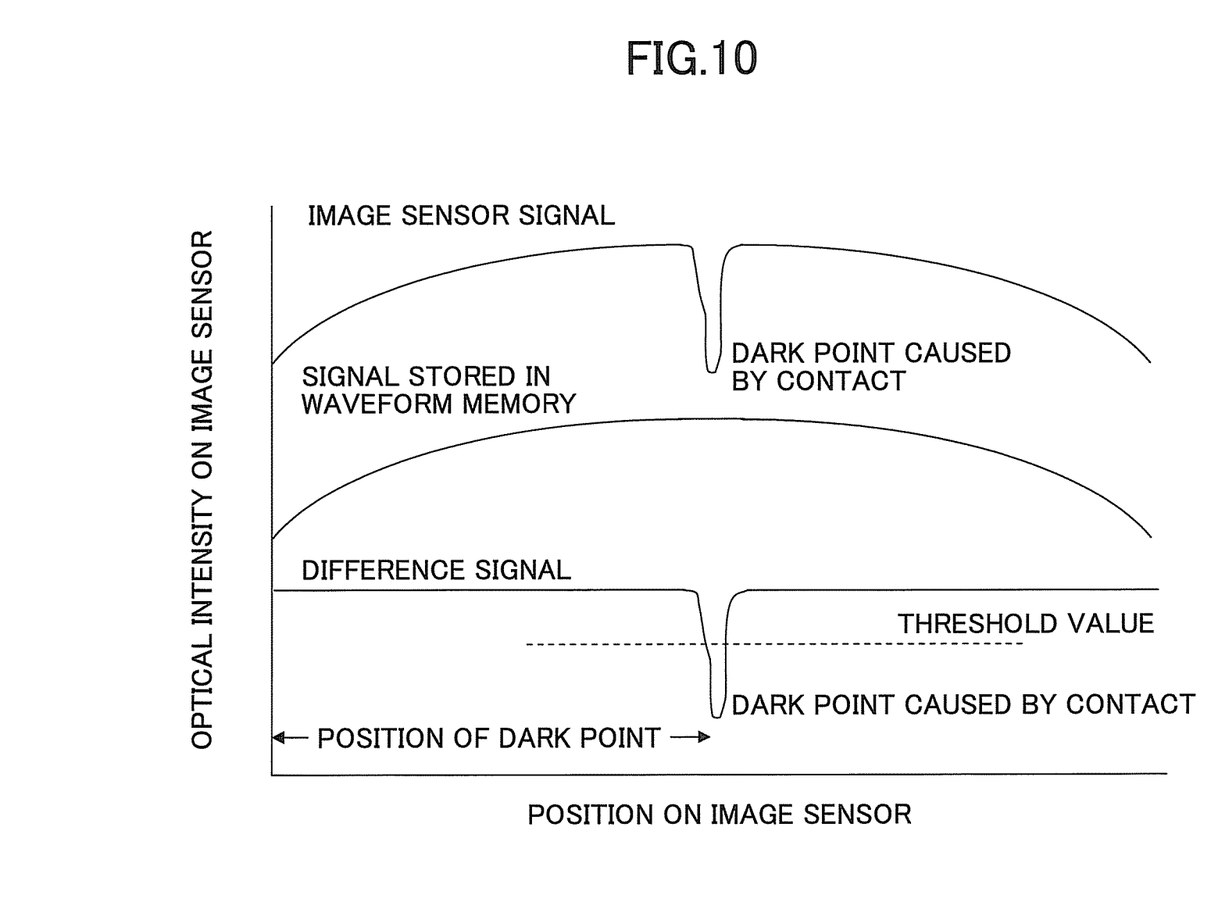
FIG. 10 is a drawing illustrating an example of the operation of a difference calculating unit.

FIG. 10 is a drawing illustrating an example of the operation of the difference calculating unit 111. A difference between the image sensor signal supplied from the waveform inputting unit 108 and the signal supplied from the waveform memory unit 110 is obtained to cancel out intensity variations caused by device characteristics and ambient light, thereby making it possible to identify a dark point created by an object in contact by use of a proper threshold value.

Referring to FIG. 9 again, the coordinate calculating unit 112 calculates the position of the dark point and the coordinates of the contact point based on the position of the dark point.

The coordinate outputting unit 113 outputs the coordinate values calculated by the coordinate calculating unit 112 in such a form as is recognizable by the personal computer 200.

Figure 11:
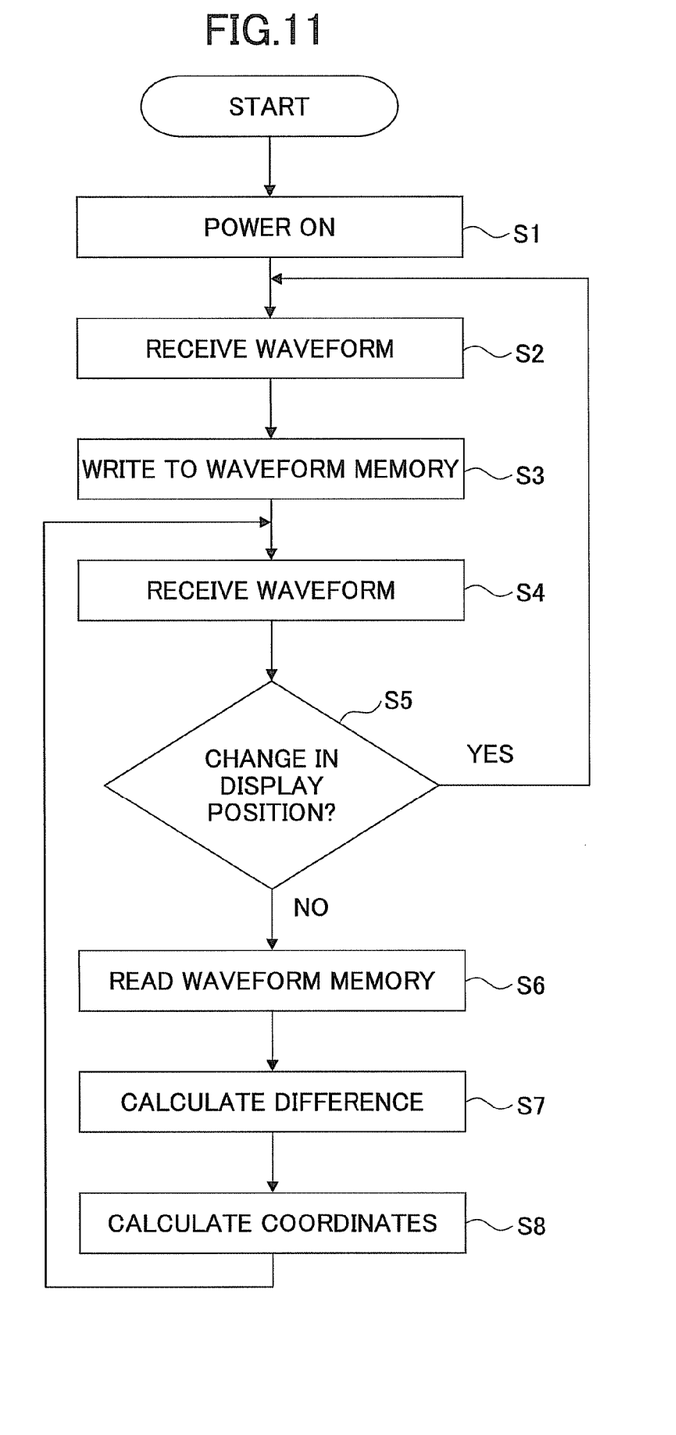
FIG. 11 is a flowchart illustrating an example of the procedure performed by the display apparatus.

FIG. 11 is a flowchart illustrating an example of the procedure performed by the display apparatus 100.

In FIG. 11, the display apparatus 100 is powered on (step S1). The waveform inputting unit 108 receives a waveform from the touch-sensor-head optical system 106 (step S2). The waveform inputting unit 108 writes the received waveform in the waveform memory unit 110 (step S3).

The waveform inputting unit 108 receives a waveform from the touch-sensor-head optical system 106 (step S4).

The waveform store indicating unit 109 checks based on a signal from the rotation detecting unit 105 whether the position of the display 103 has been changed (step S5). When there has been a change (Yes in step S5), the procedure returns to step S2 in which the waveform inputting unit 108 receives a waveform.

When there has not been a change (No in step S5), the difference calculating unit 111 reads the stored waveform from the waveform memory unit 110 (step S6), and calculates a difference between the stored waveform and the waveform received by the waveform inputting unit 108 (step S7).

The coordinate calculating unit 112 calculates coordinates based on the position of a dark point that is identified from the calculated difference by use of a predetermined threshold value (step S8). The procedure then returns to the step S4 in which the waveform inputting unit 108 receives a waveform.

In the embodiment described above, the rotation of the display 103 is detected. Switches and sensors may be arranged to detect changes in the elevation angle and the depression angle as well as rotation in horizontal direction. With such an arrangement, the memory may be overwritten with a new waveform in response to any type of movement that changes an effect of ambient light on the display 103. Further, a gyro or vibration sensor may be used to detect the placement of the display 103 in respect to the floor, so that the memory is overwritten with a new waveform in response to a change in ambient light caused by the change of the installed position.

<Summary>

As was described heretofore, according to at least one embodiment, coordinates can be accurately detected without requiring a user to perform calibration even when ambient light such as illumination light used in the installed position is changed due to a positional change of the display apparatus with an optical touch panel, such a change including a change in its location through movement in a vertical or horizontal direction and a change in its elevation angle, depression angle, azimuth angle, rotation in a display plane, etc. This arrangement achieves significant improvement in usability.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese priority application No. 2012-082239 filed on Mar. 30, 2012, with the Japanese Patent Office, the entire contents of which are hereby incorporated by reference.

LIST OF DOCUMENTS

[Patent Document 1] Japanese Patent Application Publication No. 61-239322
[Patent Document 2] Japanese Patent No. 4627781
[Patent Document 3] U.S. Pat. No. 4,507,557
[Patent Document 4] Japanese Patent Application Publication No. 2008-176802
[Patent Document 5] Japanese Patent Application Publication No. 2010-85479

What is claimed is:

1. A display apparatus, comprising:
a pointing device including a light emitting unit and a light receiving unit to detect a position of an object inserted into an optical path between the light emitting unit and a light receiving unit,
wherein the pointing device includes:
an optical intensity store unit configured to store an optical intensity distribution detected by the light receiving unit in a memory unit upon detection of a change in a position or location of a display; and
a position calculating unit configured to detect the position of the object by detecting a dark point in the optical intensity distribution caused by the insertion of the object based on a difference between the optical intensity distribution stored in the memory unit and an optical intensity distribution subsequently detected by the light receiving unit.

2. The display apparatus as claimed in claim 1, wherein the pointing device further includes a reflection unit configured to reflect light in a direction the same as a direction in which the light is incident from the light emitting unit, and the light receiving unit is disposed to receive the light reflected by the reflection unit.

3. A display system, comprising:
the display apparatus of claim 1; and
an information processing apparatus configured to output a video signal to the display apparatus and to receive a signal indicative of the position of the object from the pointing device.

4. A method of controlling a display apparatus having a pointing device including a light emitting unit and a light receiving unit to detect a position of an object inserted into an optical path between the light emitting unit and a light receiving unit, the method comprising:
an optical intensity store step of storing an optical intensity distribution detected by the light receiving unit in a memory unit upon detection of a change in a position or location of a display; and
a position calculating step of detecting the position of the object by detecting a dark point in the optical intensity distribution caused by the insertion of the object based on a difference between the optical intensity distribution stored in the memory unit and an optical intensity distribution subsequently detected by the light receiving unit.

* * * * *